Oct. 9, 1934.  W. C. LEINGANG  1,976,404
SEASONAL CONTROL OF STORAGE BATTERIES
Filed Dec. 6, 1929

WITNESS:
Rob. R. Mitchel

INVENTOR
William C. Leingang
BY
Augustus B. Stoughton
ATTORNEY

Patented Oct. 9, 1934

1,976,404

UNITED STATES PATENT OFFICE 1,976,404

SEASONAL CONTROL OF STORAGE BATTERIES

William C. Leingang, Detroit, Mich.

Application December 6, 1929, Serial No. 412,016

2 Claims. (Cl. 171—314)

My invention relates to apparatus and method for controlling the charge of a storage battery. In the accompanying drawing, Figure 1 shows one embodiment and Figure 2 shows a modification.

Figure 1:
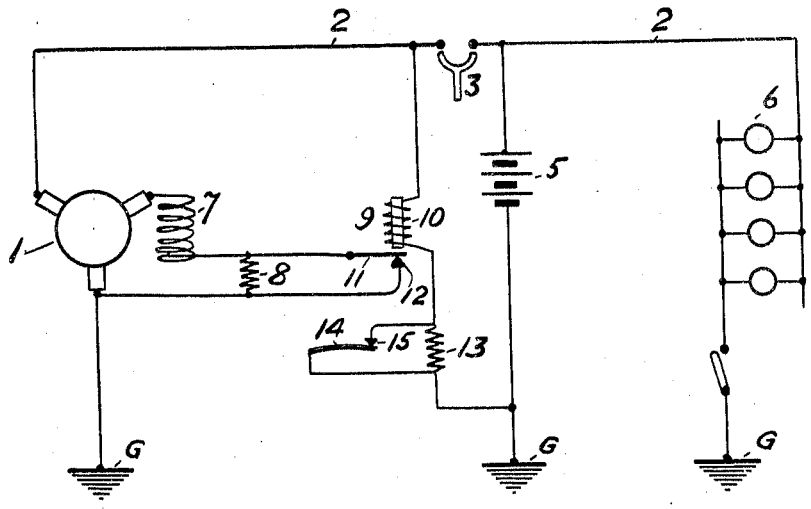

In Figure 1, 1 is a generator of the three brush type, such as is used for charging storage batteries on automobiles, the main brushes being connected respectively to the ground G and the load circuit 2. In the latter is interposed an automatic switch 3 of any well known type. A storage battery 5 is connected across the circuit as well as lamps or other translating devices 6. The field of the generator is shown at 7 and in series with this field is a resistance 8, which is adapted to be short circuited by the relay 9 when the armature of this relay 11 makes contact with the contact point 12. The armature of this relay is controlled by the solenoid 10 connected across the battery terminals through a resistance 13, which is short circuited under normal temperature conditions by the thermostatic device 14. The apparatus is so designed that when the voltage of the battery reaches a predetermined value corresponding to the beginning of gasing, the solenoid 10 will be sufficiently excited to lift the armature 11 and insert the resistance 8 in series with the field winding 7, thus reducing the charging rate by lowering the voltage of the generator. It is desired to allow the voltage of the battery to go to a higher value in cold weather before the relay 9 operates than that for which it is adjusted to operate at normal temperatures. To accomplish this, the short circuit around the resistance 13 is opened at the contact 15 by means of the thermal relay, whose moving element 14 is a bimetallic strip arranged to move away from the contact 15 at low temperatures. When the short circuit is opened around the resistance 13 in cold weather, the battery voltage must go to a higher value in order to operate the relay 9 than is required when the resistance 13 is short circuited.

It will be seen that this arrangement provides for a comparatively high charging rate for the battery during the earlier part of a charging period but when the battery approaches a fully charged condition as indicated by the rapid rise of voltage which takes place at the beginning of gasing, the charging rate is reduced to a lower value, the charge being continued at that lower value until the generator shuts down when the current in the coil 10 is interrupted and the armature 11 again makes contact with the contact point 12. Furthermore, provision is made for fixing the value of battery voltage at which this relay operates at a higher point in winter than in summer to correspond with the higher voltage required for charging the battery at low temperatures.

Figure 2:
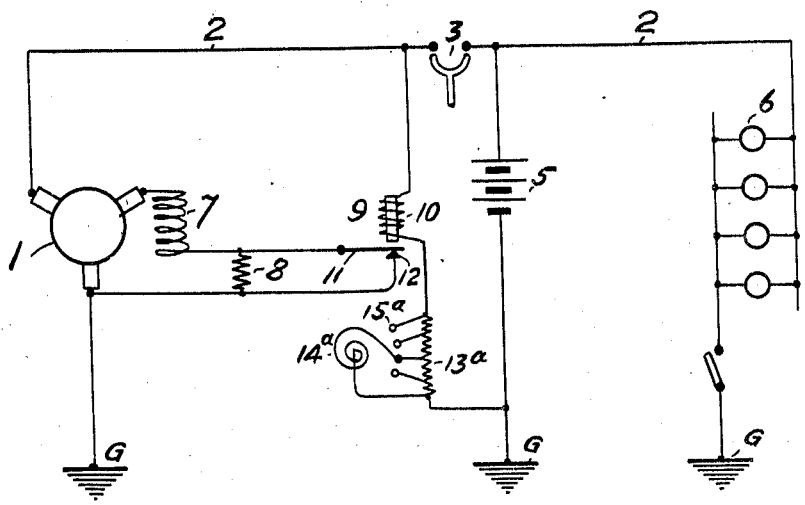

In Figure 2 the same arrangement of apparatus is shown except that the thermal relay (elements 14 and 15) is replaced by a rheostat 13a controlled in response to changes of temperature by moving element 14a and contact points 15a.

I claim:

1. The method of seasonal control for charging a storage battery comprising the following steps, starting the charge at the higher of two selected rates, reducing the charging rate to the lower of said rates at a voltage below the maximum full charge voltage of the battery corresponding to the higher rate, and varying inversely with the ambient temperature the value of the voltage at which the reduction of charging rate is effected.

2. A seasonal control means for charging storage batteries including in combination a storage battery, a generator selectively adjusted for a higher and a lower charging rate, means responsive to battery voltage below the maximum voltage corresponding to the higher charging rate for changing from the higher to the lower charging rate, and a thermostat adapted to control inversely with ambient temperature the voltage at which said means operates, said thermostat being operatively independent of the temperature and physical condition of the battery and of the temperature of the generator.

WM. C. LEINGANG.